United States Patent [19]

Sasage et al.

[11] Patent Number: 4,611,815
[45] Date of Patent: Sep. 16, 1986

[54] VEHICLE HEIGHT CONTROL SYSTEM

[75] Inventors: Yoshihiro Sasage, Shizuoka; Naoto Ooka, Toyohashi; Kaoru Oohashi, Okazaki, all of Japan

[73] Assignees: Nippondenso Co., Ltd., Kariya; Toyota Jidosha Kabushiki Kaisha, Toyota, both of Japan

[21] Appl. No.: 665,064

[22] Filed: Oct. 26, 1984

[30] Foreign Application Priority Data

Oct. 27, 1983 [JP] Japan ............................ 58-202434

[51] Int. Cl.$^4$ .......................................... B60G 17/04
[52] U.S. Cl. .................................. 280/6 R; 280/6 H; 280/707
[58] Field of Search ................. 280/707, 6 H, 6 R; 180/41

[56] References Cited

U.S. PATENT DOCUMENTS

| | | | |
|---|---|---|---|
| 3,917,307 | 11/1975 | Shoebridge | 280/6 H |
| 4,185,845 | 1/1980 | Misch et al. | 280/6 H |
| 4,257,618 | 3/1981 | Tax et al. | 280/6 H |
| 4,483,546 | 11/1984 | Brearley | 280/6 R |

Primary Examiner—Richard A. Bertsch
Attorney, Agent, or Firm—Cushman, Darby & Cushman

[57] ABSTRACT

A vehicle height control system includes a plurality of vehicle height adjusters actuated by a pneumatic actuating system and controlled respectively by control signals from a control unit. The control unit calculates, for each of the vehicle height adjusters, a target difference between a target adjustment position and an actual position detected by a vehicle height sensor associated with the adjuster. The control unit compares the target differences for respective vehicle height adjusters, and the adjuster having the target difference which is the largest in magnitude is first actuated to perform its adjusting operation, thereby preventing unbalanced differences in the vehicle height.

5 Claims, 3 Drawing Figures

4,611,815

VEHICLE HEIGHT CONTROL SYSTEM

BACKGROUND OF THE INVENTION

1. FIELD OF THE INVENTION

The present invention relates to a vehicle body height control system or more particularly, to a vehicle body height control system with an improved riding feeling or performance during the process of vehicle body height adjustment. The system of this invention is hereinafter referred to simply as the vehicle height control system.

The present invention is applicable to a vehicle height control system in which a vehicle height adjuster is arranged for each wheel (one for each of the front wheels and one for either each of the rear wheels or all of the rear wheels) to control the distance between each wheel and the vehicle body, namely, the vehicle body height, with each vehicle height adjuster independently.

2. DESCRIPTION OF THE PRIOR ART

A vehicle height control system has been proposed conventionally, in which, in order to obtain a desired vehicle height in response to the number of passengers, the amount of loads, the running conditions and the road surface conditions, a plurality of vehicle height adjusters are provided to control the vehicle body height at a target level.

In such a conventional vehicle height control system, an attempt to extend or contract all the vehicle height adjusters by the same height would necessitate different extension or contraction rates (different adjusting rates) for the respective vehicle height adjusters because of the differences in the loads on or in the spring characteristics of the respective vehicle height adjusters.

This variation in the adjusting rate causes an unstable slant of the vehicle body under adjustment and undesirably makes the driver and passengers (hereinafter simply called "the driver") anxious.

This problem is attributable to the fact that each vehicle height adjuster is extended or contracted regardless of the adjusting rate of the other adjusters.

The present invention is intended to obviate this disadvantage of the prior art.

SUMMARY OF THE INVENTION

The primary object of the present invention is to provide a vehicle height control system with an improved riding feeling or performance.

To achieve the above-mentioned object, there is provided according to one aspect of the present invention a vehicle height control system in which, in order for each vehicle height adjuster to perform the adjusting operation in coordination with the other vehicle height adjusters, the vehicle height adjusters perform the adjusting operation in the descending order of the deviation or difference between the actual adjustment position and a target adjustment position, namely, sequentially starting from the vehicle height adjuster of greater deviation from, among the respective vehicle height adjusters.

According to another aspect of the present invention, there is provided a vehicle height control system wherein the actual positions corresponding to the results of adjustment by a plurality of adjusters are fed back to control means for compensating for the variations in the adjusting processes among the adjusters, comprising a plurality of the vehicle height adjusters actuated for the adjustment in response to a control signal, position signal generator means for generating an actual position signal corresponding to the result of adjustment of the respective adjusters, setting means for changing the target adjustment positions of the adjusters, and control means responsive to the position signal generator means and the setting means for generating and supplying the adjusters with a control signal for causing the adjusters to perform the adjusting operation in the descending order of the calculated deviation of the actual position from the target position of the respective vehicle height adjusters.

In embodying the present invention, the rear part of the vehicle body may be raised always before the front part thereof in order to prevent the vehicle body from slanting at every adjusting operation, in view of the fact that the target deviation of the respective adjusters are substantially the same.

DESCRIPTION OF THE PREFERRED EMBODIMENTS

Figure 1:
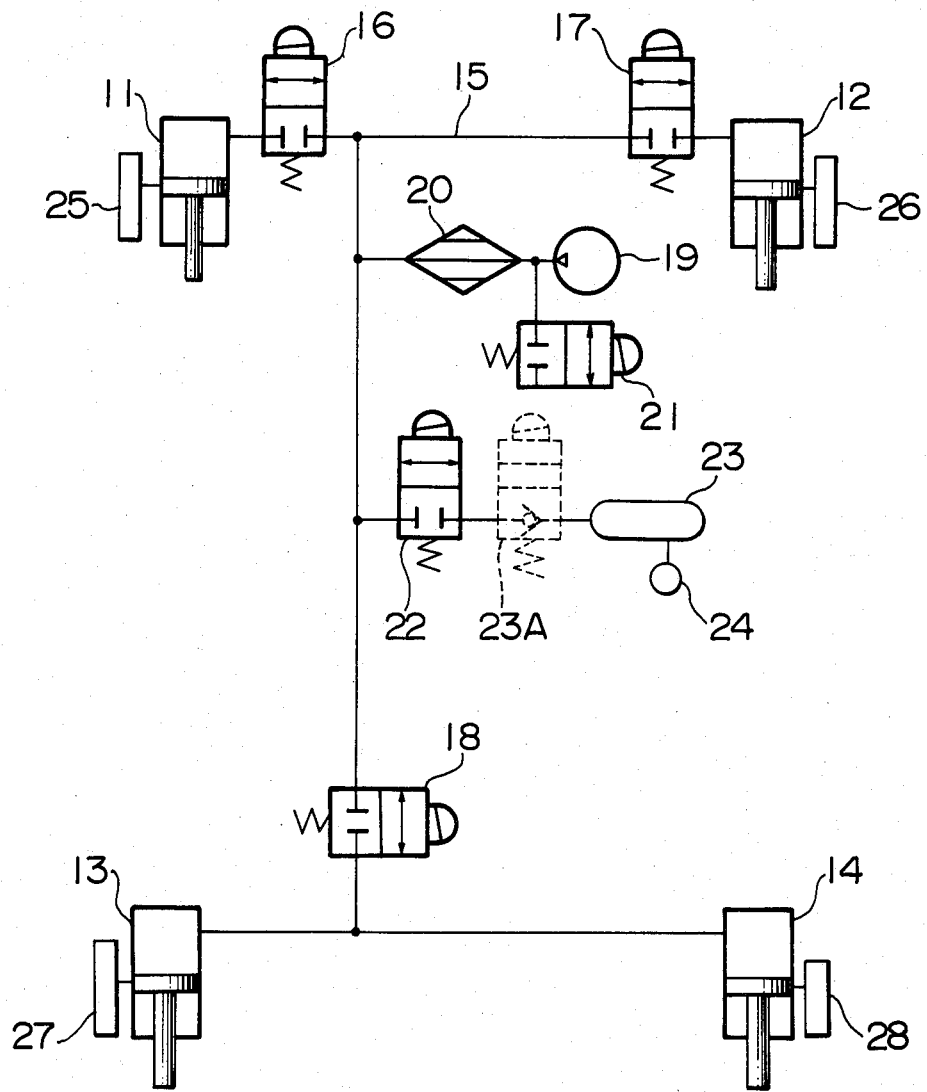
FIG. 1 is a diagram showing the arrangement of vehicle height adjusters.

An arrangement of adjusters according to the present invention as applied to an air suspension system is shown in FIG. 1. In FIG. 1, numerals 11 to 14 designate vehicle height adjusting units or shock absorbers mounted on the wheels of a four-wheeled vehicle. The shock absorbers 11, 12 for the front wheels, combined with normally-closed solenoid valves 16, 17 adapted to communicate with the air passage 15 upon energization thereof, make up adjusters capable of adjusting the vehicle height, that is, the distance between the wheels and the vehicle body. The shock absorbers 13, 14, on the other hand combined with a similar solenoid valve 18 for common connection or cut off with the air passage 15, also make up a vehicle height adjuster.

In the air supply/exhaust system connected with the air passage 15, an electrically-operated air pump 19 supplies compressed air to the air passage 15 through an air dryer 20. Also, a normally-closed solenoid valve 21 for opening the air passage 15 upon energization thereof is inserted between the air pump 19 and the dryer 20. The dryer 20 is provided with a moisture-absorbing member for removing the moisture contained in the air supplied from the pump 19 to the air passage 15, which moisture-absorbing member is dried when the air is released into the atmosphere through the solenoid valve 21 from the air passage 15.

The air passage 15 is also connected with an air tank 23 through a normally-closed solenoid valve 22. The air tank 24 includes a pressure detection switch 24 for generating a signal when the air pressure in the tank is reduced below a predetermined level.

The vehicle height adjusters operate in such a way that upon energization of the solenoid valves 16 to 18 to connect the shock absorbers 11, 12 and 13, 14 to the air passage 15, upon energization of the solenoid valve 22 for the tank, and further upon de-energization (cut-off) of the exhausting solenoid valve 21, the vehicle-height adjusting cylinders of the shock absorbers 11 to 14 are supplied with air respectively thereby to raise the vehicle height against the load of the vehicle body. Upon energization of the solenoid valves 16 to 18 to connect the shock absorbers 11, 12 and 13, 14 with the air passage 15, and upon energization of the exhausting solenoid valve 21, on the other hand, the air is exhausted from the cylinders thereby to reduce the vehicle height. In the exhaust process, the tank solenoid valve 22 is de-energized to prevent the pressure from dropping in the tank.

The air pressure in the air tank 23 is maintained at more than a predetermined level while the control system is in operation. Specifically, a driver circuit (not shown) is provided, which is actuated upon turning on of the main switch (not shown) following the turning on of a key switch and which actuates the electrically-operated air pump 19 in response to a signal indicating the decrease in the air pressure from the pressure detection switch 24.

An appropriate orifice is provided in the path of the exhausting solenoid valve 21 in order to prevent an abrupt exhausting operation. Further, a solenoid valve 23A functioning as a check valve in the de-energized state may be provided in the path of the air tank 23 in order to maintain the pressure in the air tank 23 even at the exhaust time.

The shock absorbers 11 to 14 are provided with vehicle height sensors 25 to 28 respectively for generating an actual position signal indicative of the vehicle height corresponding to the result of adjustment of the vehicle height adjusters. These vehicle height sensors, which generate signals changing stepwise or continuously in accordance with the vehicle height, may be of a well-known photo-electric or inductance type.

Figure 2:
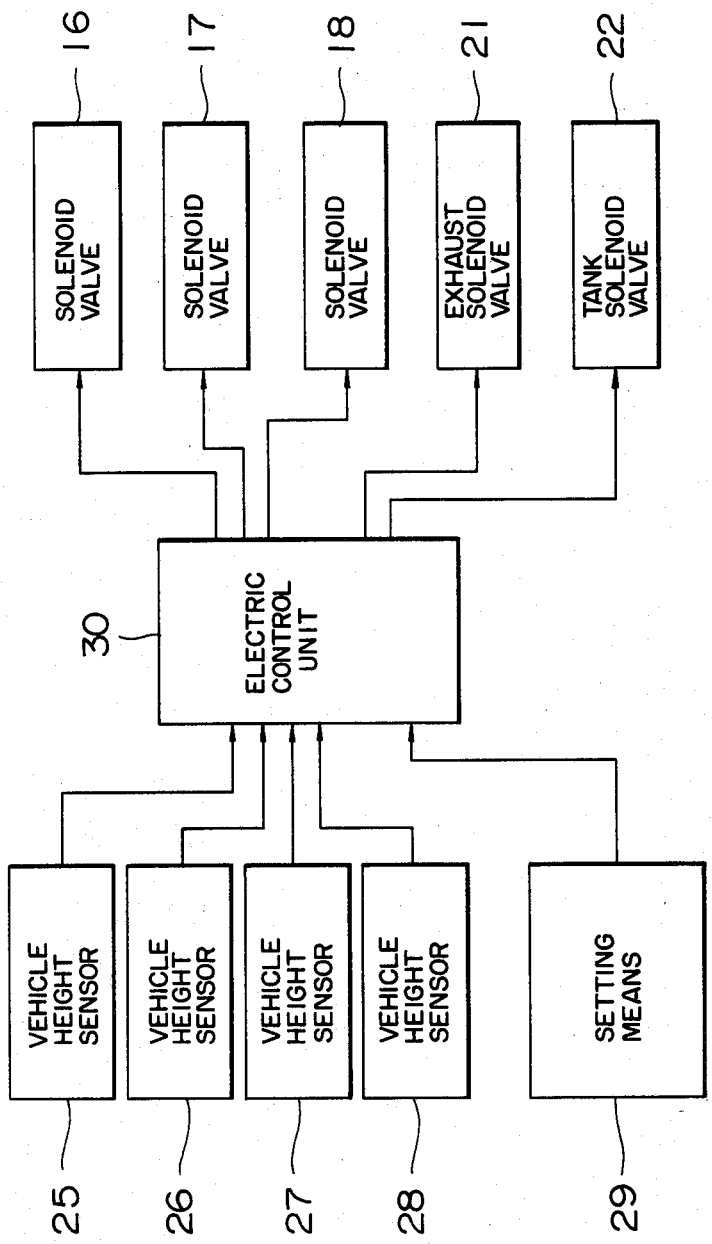
FIG. 2 is an electrical circuit diagram for the embodiment shown in FIG. 1.

An electrical circuit for the above-mentioned system is shown in FIG. 2. The driver circuit for the air pump 19 is not shown in the diagram as described above.

The setting means designated by numeral 29 generates a change signal for changing the target position for controlling the vehicle height. This change signal is generated in association with at least one of the factors corresponding to the number of passengers and the amount of loads, the running conditions such as the driving speed, the road surface conditions such as the inclination of the road, or the operation of a manual switch.

Signals generated by the vehicle height sensors 25 to 28 and the setting means 29 are applied to an electrical control unit 30. The electrical control unit 30 includes an operating circuit (microcomputer) for executing the operating process specified by a computer program set in advance, and an input/output interface for applying an input signal to the operating circuit and transmitting an output signal corresponding to the result of operation of the operating circuit to an external circuit.

Figure 3:
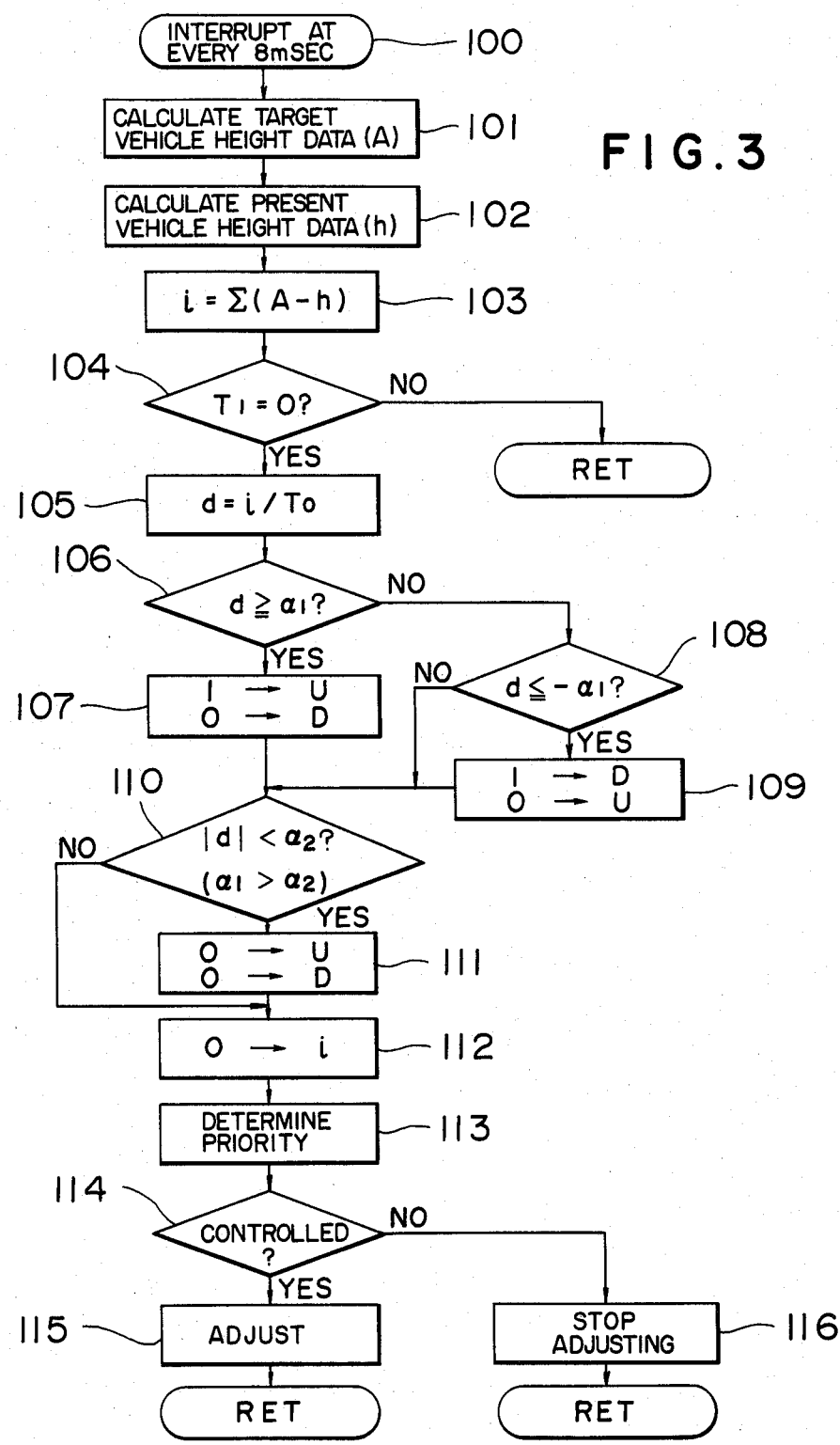
FIG. 3 is a flowchart showing a control program for an operating circuit included in an electrical control unit of FIG. 2.

FIG. 3 shows the essential parts of a vehicle height control program related to the present invention, which program is executed by the operating circuit in the electrical control unit 30. The shown program is started at regular intervals of several msec at the interruption entrance step 100 thereby to control the repetitive vehicle height adjusting processes.

The operation of this system will be explained below with reference to the vehicle height control program. First, the program step 101 shown in FIG. 3 calculates (determines) the data A indicative of the target adjustment position of the vehicle height adjusters in response to the change signal supplied thereto from the setting means 29, by means of the operating circuit in the electrical control unit 30. From this calculation, target positions $A_1$, $A_2$ and $A_3$ are obtained separately for the respective adjusters which take a predetermined value in relation to the change signal. In this case, the target position $A_1$ indicates the target value of the adjuster for the front left wheel, $A_2$ that for the front right wheel, and $A_3$ the that for the two rear wheels (average value).

In the following embodiment, a control relating to the driving speed as well as the control program will be explained as an example of the actual vehicle height control. It is assumed that any of the "high", "middle" and "low" stages are selected as the target adjustment positions for the respective adjusters. It is also assumed that the setting means 29 includes a vehicle speed sensor for detecting the vehicle speed, and that when the vehicle speed exceeds a predetermined level, for instance, 80 km/hr, the two adjusters for front wheels are set to "low" and the two adjusters for the rear wheels to "middle" according to the program at step 101.

Step 102 stores therein data h indicative of the actual instantaneous vehicle height in response to the actual position signals produced from the vehicle height sensors 25 to 28. These data h are used to obtain data $h_1$ and $h_2$ indicative of the vehicle height of the two front wheels and an average value $h_3$ of the vehicle heights for the two rear wheels, thus producing three vehicle height data $h_1$, $h_2$ and $h_3$.

The next step 103 accumulatively calculates the difference or deviation between the vehicle height data h and the target data A, that is, the target difference for each of the hieght adjusters thereby to produce data i ($i_1$, $i_2$, $i_3$) indicative of the accumulated target difference at a set time $t_1$. Step 104 functions to specify the set time $t_1$ by monitoring the timer data $T_1$ which is updated by counting up and periodically reduced to zero by a timer routine not shown.

Upon the lapse of the set time $t_1$, the step 105 is executed by the operating circuit. Step 105 divides the accumulative target difference data d obtained for each adjuster by the set data $T_0$ corresponding to the set time $t_1$, thus calculating the average target difference data d ($d_1$, $d_2$, $d_3$) for the target adjustment positions.

At step 106, a target difference d for each adjuster is compared with a predetermined appropriate positive value $\alpha_1$, and when the target difference exceeds the value of $\alpha_1$, an up flag is set for each adjuster at step 107. In the case where the value d does not exceed $\alpha_1$, on the other hand, the target difference d is compared with a negative value $-\alpha_1$ at step 108, and if the target value exceeds this negative value, step 109 sets a down flag D for each adjuster.

At step 110, the absolute value of the target difference d is compared with the tolerance $\alpha_2$ for each adjuster. The value $\alpha_1$1 is determined larger than the value $\alpha_2$. If the target value d is not more than the tolerance $\alpha_2$, step 111 resets the up and down flags U and D for each adjuster thus determined. At step 112, all the accumulative target difference i calculated previously are reset.

The operating circuit determines an adjuster to be adjusted in priority at step 113. In the process of determination, the absolute values of the target differences $d_1$, $d_2$ and $d_3$ for the adjusters are compared with each other, and the maximum value among them is extracted, thereby specifying the adjuster associated with the maximum value.

By way of explanation, assume that the actual positions of the adjusters are all "high" and that the target adjustment position A has been calculated as mentioned above as the driving speed has exceeded 80 km/h. One of the adjusters for the vehicle front part of which the target difference d is large is first selected as an adjuster to be adjusted.

At steps 114 to 116, the operating circuit makes actual adjusting operations. Step 114 checks the up flag U and the down flag D for the adjuster determined at step 113, and, if any of the flags U and D is set, carries out the adjusting operation specified at step 115, while if neither flag is set, step 116 stops the adjusting operation.

At the adjusting operation step 115, if the up flag U is set for the adjuster specified, a corresponding one of the solenoid valves 16 to 18 is supplied with an activation signal to open the same on the one hand, and the exhaust solenoid valve 21 is de-energized and the tank solenoid valve 22 is energized on the other hand, thus extending the vehicle height adjusting unit of the corresponding shock absorber thereby to raising the vehicle body. In the case where the down flag D is set, the corresponding one of the solenoid valves 16 to 18 is opened while at the same time opening the exhaust solenoid valve 21 and de-energizing the tank solenoid valve 22, so that the vehicle height adjusting unit of the shock absorber is compressed by the vehicle body load thereby lowering the vehicle body. At step 115, the corresponding ones of the solenoid valves 16 to 18 for the remaining adjusters other than the specified one are de-energized to close thereby to prevent them from participating in the adjusting operation.

The adjustment stop step 116 de-energizes all the solenoid valves 16 to 18 for the adjusters, so that the vehicle height adjusting operation is not performed.

Under the preceding assumption, if the target difference of the adjuster corresponding to the right front wheel is larger than those of the remaining wheels, the adjusting operation is first performed to lower the vehicle height by the particular adjuster, and when the target difference thereof is reduced below that for one of the other adjusters, the particular one of the adjusters is subjected to the adjusting operation. In this way, in a cycle determined by the set time $t_1$, an adjuster to be subjected to control in priority is determined, with the result that the vehicle height adjusters are controlled sequentially in stages until the height of the whole vehicle comes to coincide with the target adjustment position.

And when all the target differences d have been controlled within the range of the tolerable value $\alpha_2$, the adjusting operation is stopped.

As mentioned above, the system according to the above-described embodiment determines an adjuster to be firstly adjusted in accordance with the magnitude of the target difference, and on the basis of this determination, the respective adjusters are operated in sequence, thereby making it possible to control the vehicle height at a target level without causing any unbalanced difference in the vehicle height. This system is effectively applied to the adjusting operation of a plurality of vehicle height adjusters, in which the vehicle height on the front wheels is increased or decreased from a given height, or the front or rear part is raised or lowered, or all the adjusters are raised or lowered.

In determining an adjuster first to be operated according to the present invention, the relative difference between target differences $d_1$, $d_2$ for the front wheel adjusters and the target difference $d_3$ for the rear wheel may be corrected in advance of the execution of step 113 in order to maintain the vehicle body slightly slanted forward. If all the target differences are positive in this correction procedure, the target difference $d_3$ for the rear wheel is increased by the offset $k_1$, while if the target differences are all negative, the target difference $d_3$ for the rear wheels alone is reduced by the offset $k_2$.

The present invention is applicable also with equal effect to a vehicle equipped with a vehicle adjusting system using a hydropneumatic suspension, in which case the air supply/exhaust system with the air passage 15 is replaced with an oil supply passage and an oil drain passage independent of each other, and these passages are selectively switched for each adjuster by means of a solenoid valve. At the same time, such an alternative may be provided with a vehicle height sensor for each adjuster with an electric circuit similar to those shown in FIGS. 2 and 3. The adjusting rate of the adjusters for the hydropneumatic suspension is considerably higher than that for the air suspension, and therefore the set time $t_1$ is required to be set shorter in application of the control program of FIG. 3 for the hydropneumatic suspension.

In applications of the present invention, the number of vehicle height adjusters and their arrangement with respect to wheels may be determined appropriately in the embodiment of the present invention.

Further, in the configuration of the embodiment described above, individual parts may be replaced with equivalent ones of different names or the control program of the operating circuit may be partially altered as required.

It will thus be understood from the foregoing description that according to the present invention, the target difference between actual positions and target adjustment positions of a plurality of respective vehicle height adjusters is determined and the adjusters are sequentially operated according to the magnitude of the target difference, so that the vehicle height can be controlled stably without any unbalanced slant of the vehicle body while at the same time improving the riding feeling or performance during the process of adjustment.

We claim:

1. A vehicle height control system comprising:
 a plurality of vehicle height adjusters operated in response to respective control signals;
 position signal generator means for generating actual position signals each representing a vehicle height of a wheel corresponding to one of said vehicle height adjusters;
 setting means for changing target adjustment positions of respective vehicle height adjusters; and
 control means for generating the control signal for each of said vehicle height adjusters in accordance with a target difference between the target adjustment position and the actual position signal to adjust the vehicle height to achieve the target adjustment position,
 said control means comparing said target difference for each vehicle height adjuster with a first set value range ($\alpha_1$) and generating an up-command to increase the vehicle height when said target difference exceeds an upper limit of said first set value range ($\alpha_1$) and generating a down-command to decrease the vehicle height when said target difference is below said value range ($\alpha_1$), said control means comparing said target difference with a second set value range ($\alpha_2$) smaller than said first set value range ($\alpha_1$) and generating a cancel signal when said target difference enters into said second set value range ($\alpha_2$), and said control means selecting one of said target differences, for the respective adjusters, having the largest magnitude of absolute value of said target differences, and selecting one of said vehicle height adjusters corresponding to the selected target difference to thereby enable the selected vehicle height adjuster to perform its adjusting operation first, thereby taking priority over the other vehicle height adjusters.

2. A system according to claim 1, wherein said vehicle height adjusters are actuated by a plurality of actuating systems including two systems corresponding to right and left front wheels of a vehicle, and one system for adjusting right and left rear wheels commonly.

3. A system according to claim 1 wherein said control means maintains a previous command when any of said target differences enters into said first set value range ($\alpha_1$).

4. A system according to claim 1, wherein said control means
 (a) fetches said actual position signals from said position signal generator means and said target adjustment position signals from said setting means a number of times during a predetermined time ($T_0$),
 (b) obtains after the lapse of said predetermined time ($T_0$), an average target difference for each of said vehicle height adjusters based on said signals fetched for the number of times,
 (c) generates the control signal for each of said vehicle height adjusters in accordance with said average target difference, and repeats the operations (a), (b), and (c).

5. A vehicle height control system comprising:
a plurality of vehicle height adjusters operated in response to respective control signals;
position signal generator means for generating actual position signals each representing a vehicle height of a wheel corresponding to one of said vehicle adjusters;
setting means for changing target adjustment positions of said vehicle height adjusters respectively; and
control means
 (a) for fetching said actual position signals a number of times during a predetermined time ($T_0$),
 (b) for obtaining a target difference for each of said vehicle height adjusters, said target difference corresponding to an average difference between the actual position signal and the target adjustment position obtained based on said actual position signals fetched the number of times and based on said target adjustment positions during said predetermined time ($T_0$),
 (c) for generating the control signal for each of said vehicle height adjusters in accordance with said target difference after the lapse of the predetermined time ($T_0$) thereby enabling said each of said vehicle height adjusters to perform adjusting operation of the vehicle height to reach said target adjustment position;

wherein said control means compares said target difference with a first set value range ($\alpha_1$) and generates an up-command to increase the vehicle height when said target difference exceeds an upper limit of said first set value range ($\alpha_1$) and generates a down-command to decrease the vehicle height when said target difference is below said value range ($\alpha_1$), said control means compares said target difference with a second set value range ($\alpha_2$) smaller than said first set value range ($\alpha_1$) and generates a cancel signal when said target difference enters into said second set value range ($\alpha_2$), and said control means selects one of said target differences, for the respective adjusters, having the largest magnitude of absolute value of said target differences, and selects one of said vehicle height adjusters corresponding to the selected target difference thereby enabling the selected vehicle height adjuster to perform its adjusting operation first, thereby taking priority over the other vehicle height adjusters.

* * * * *